United States Patent
Morgan

(10) Patent No.: US 6,178,128 B1
(45) Date of Patent: Jan. 23, 2001

(54) PROGRAMMABLE VOLTAGE DIVIDER AND METHOD FOR TESTING THE IMPEDANCE OF A PROGRAMMABLE ELEMENT

(75) Inventor: Donald M. Morgan, Boise, ID (US)

(73) Assignee: Micron Technology, Inc., Boise, ID (US)

(*) Notice: Under 35 U.S.C. 154(b), the term of this patent shall be extended for 0 days.

(21) Appl. No.: 09/318,571

(22) Filed: May 26, 1999

Related U.S. Application Data

(62) Division of application No. 08/813,063, filed on Mar. 7, 1997, now Pat. No. 5,952,833.

(51) Int. Cl.[7] .................................................. G11C 7/00
(52) U.S. Cl. ........................................ 365/201; 365/225.7
(58) Field of Search ............................... 365/201, 225.7, 365/230.03

(56) References Cited

U.S. PATENT DOCUMENTS

| | | | |
|---|---|---|---|
| 4,572,971 | 2/1986 | Necoechea | 307/260 |
| 4,698,589 | 10/1987 | Blankenship et al. | 324/158 |
| 5,539,306 | 7/1996 | Riggio, Jr. | 324/158.1 |
| 5,539,690 * | 7/1996 | Talreja et al. | 365/185.22 |
| 5,654,663 | 8/1997 | McClure et al. | 327/530 |
| 5,912,852 * | 6/1999 | Lawrence et al. | 365/201 |
| 5,995,424 * | 11/1999 | Lawrence et al. | 365/201 |
| 6,005,799 * | 12/1999 | Rao | 365/168 |

* cited by examiner

Primary Examiner—Richard Elms
Assistant Examiner—Anh Phung
(74) Attorney, Agent, or Firm—Dorsey & Whitney LLP

(57) ABSTRACT

A programmable voltage divider has normal and test modes of operation. The divider includes first and second supply nodes, a divider node that provides a data value, and a first divider element that is coupled between the first supply node and the divider node. The divider also includes a controlled node, a second divider element that has a selectable resistivity and that is coupled between the divider node and the controlled node, and a test circuit that is coupled between the controlled node and the second supply node. During the normal mode of operation, the first and second divider elements generate the data value having a first logic level when the second divider element has a first resistivity, and generate the data value having a second logic level when the second divider element has a second resistivity. The test circuit generates a first voltage at the controlled node during the normal mode of operation, and generates a second voltage at the controlled node during the test mode of operation. The test circuit may generate the first and second voltages by varying its impedance, or by switching in and out one or more fixed voltages.

14 Claims, 7 Drawing Sheets

PROGRAMMABLE VOLTAGE DIVIDER AND METHOD FOR TESTING THE IMPEDANCE OF A PROGRAMMABLE ELEMENT

CROSS-REFERENCE TO RELATED APPLICATION

This application is a divisional of U.S. patent application Ser. No. 08/813,063, filed Mar. 7, 1997, now U.S. Pat. No. 5,952,833 issued Sep. 14, 1999.

TECHNICAL FIELD

The present invention relates generally to electronic circuits, and more specifically to a programmable circuit that allows one to test the impedance of a programmable element, such as a fuse, during a test mode, and to a method for performing such a test.

BACKGROUND OF THE INVENTION

Many of today's integrated circuits, such as memory circuits, are programmable to operate in one or more particular modes, or to have one or more particular circuit configurations. An example of the latter type of circuit is a memory that includes redundant memory columns for replacing defective array memory columns. When a circuit tester discovers a defective array column, it programs the memory such that when an external device addresses the defective column, data is routed to a selected redundant column in a manner that is transparent to the external device. Typically, the manufacturer programs such integrated circuits at the factory before shipping them to customers.

These integrated circuits each typically include a bank of nonvolatile, programmable memory elements that the manufacturer programs to set a circuit in the desired operational mode or circuit configuration. Examples of such elements include electrically erasable and programmable read-only memory (EEPROM) cells, fuses, and antifuses. An integrated circuit often incorporates into its programmable bank the type of programmable element that is the most similar to other elements or components of the circuit. For example, a Flash-EEPROM device often includes a bank of EEPROM cells, but a dynamic random access memory (DRAM) often includes a bank of antifuses, which are similar in structure to the DRAM storage capacitors. Furthermore, such a programmable element typically has a first impedance in an unprogrammed state, and a second, different impedance in a programmed state. For example, an antifuse has a high impedance in an unprogrammed state, and thus is essentially an open circuit, and has a low impedance in a programmed state, and thus is essentially a short circuit. Conversely, a fuse is essentially a short circuit in an unprogrammed state, and is essentially an open circuit in a programmed state.

But because a programmed element may not always have an impedance that is within a desired range, the manufacturer often measures the impedances of the programmed elements in an analog fashion after it finishes programming the entire programmable bank. The analog tester performs these measurements sequentially by placing a voltage across each programmed element and measuring the current therethrough. If the manufacture discovers a programmed element that does not have the desired impedance, it can reprogram the element one or more times until it has the desired impedance.

A problem with this analog testing technique is that it often takes too long for high-density integrated circuits. As the number of circuit components in an integrated circuit increases, so does the number of operational modes and circuit configurations that the circuit supports. Therefore, the number of programmable elements in the programmable bank also increases to accommodate the additional operational modes and circuit configurations. For example, a megabit DRAM may have 20 antifuses in its programmable bank, but a 64 megabit DRAM may have 640 antifuses. Furthermore, measuring the impedance in an analog fashion is relatively slow because of the parasitic capacitances associated with the test path and each programmed element. Thus, increasing the storage capacity of a DRAM by a factor of 16 can potentially increase the number of antifuses, and thus the already lengthy testing time, by a factor of 32. Additionally, testers that can perform analog measurements are often expensive and complicated to operate in the analog-testing mode.

SUMMARY OF THE INVENTION

In accordance with one aspect of the present invention, a programmable voltage divider has normal and test modes of operation. The divider includes first and second supply nodes, a divider node that provides a data value, and a first divider element that is coupled between the first supply node and the divider node. The divider also includes a controlled node, a second divider element that has a selectable resistivity and that is coupled between the divider node and the controlled node, and a test circuit that is coupled between the controlled node and the second supply node. The test circuit generates a voltage at the controlled node during the normal mode of operation, and varies this voltage during the test mode of operation.

In a related aspect of the present invention, the test circuit includes first switch coupled between the controlled node and the second supply node and a series combination of a second switch and a voltage source, the series combination coupled in parallel with the first switch. During the test mode, the test circuit opens the first switch and closes the second switch.

In another related aspect of the invention, the test circuit includes a first switch coupled between the controlled node and the second supply node, and a series combination of a second switch and an impedance element, the series combination coupled in parallel with the first switch. During the test mode, the test circuit opens the first switch and closes the second switch.

In yet another related aspect of the invention, the test circuit includes a first switch coupled between the controlled node and the second supply node, and a diode coupled in parallel with the first switch. During the test mode, the test circuit opens the first switch.

An advantage of the present invention is that it allows faster testing of programmable elements as compared with the prior art. Another advantage is that the present invention allows digital testing of programmable elements instead of analog testing.

DETAILED DESCRIPTION OF THE INVENTION

Figure 1:
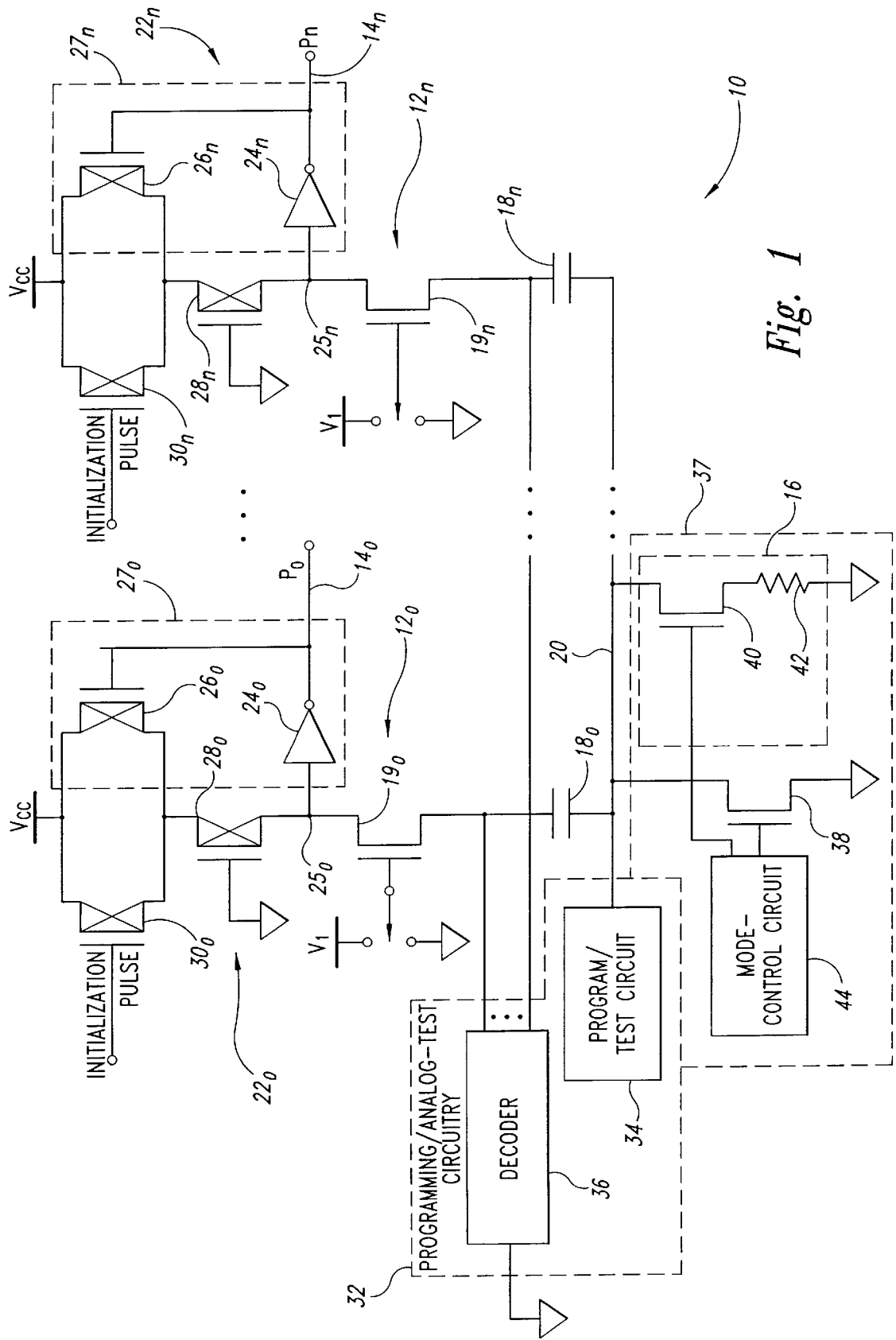
FIG. 1 is a schematic diagram of a programmable bank according to a first embodiment of the invention.

FIG. 1 is a schematic diagram of a programmable bank 10 according to a first embodiment of the invention. The bank 10 includes individually programmable circuits $12_0$–$12_n$, which generate binary reference signals $P_0$–$P_n$ at respective output nodes $14_0$–$14_n$. The actual logic levels of the signals $P_0$–$P_N$ depend upon the states in which the circuits $12_0$–$12_n$ are programmed. The integrated circuit (not shown in FIG. 1) that incorporates the bank 10 uses the signals $P_0$–$P_N$ to select its operational modes or to configure its circuitry. The bank 10 also includes a test circuit 16, which allows the manufacturer to test the programmable circuits $12_0$–$12_n$ in a digital manner, i.e., by merely reading the values $P_0$–$P_N$. Thus, the manufacturer can test the bank 10 in a manner that is both faster and easier than prior testing techniques. Furthermore, the bank 10 may support conventional analog testing as well as the inventive digital testing. The bank 10 is discussed below in greater detail with specific reference to the programmable circuit $12_0$, which is similar in structure and operation to the other programmable circuits $12_1$–$12_n$.

The programmable circuit $12_0$ includes a programmable element $18_0$, which is an antifuse in this first embodiment of the invention. A first node of the antifuse $18_0$ is coupled to a test node 20, which is common to the first nodes of all the antifuses $18_0$–$18_n$. A second node is coupled to an isolation device $19_0$, which limits the voltage across the antifuse $18_0$ during normal operation of the bank 10. In one aspect of the invention, the device 19 is an NMOS transistor, which has its gate coupled to a voltage $V_1$ during normal operation of the bank 10, and to 0 V, i.e., ground, during programming of the bank 10.

The circuit $12_0$ also includes a latch/pull-up circuit $22_0$, which generates the signal $P_0$ in response to the state of the antifuse $18_0$. The circuit $22_0$ includes an inverter $24_0$, which has an input terminal coupled to a reference node $25_0$. The circuit $22_0$ also includes a feedback switch $26_0$, which together with the inverter $24_0$ forms a latch $27_0$, an impedance element, e.g. a pull-up or divider device $28_0$, and an initialization switch $30_0$, which allows the circuit $22_0$ to generate the desired value for $P_0$ during the initial power-up of the integrated circuit that incorporates the bank 10. In one aspect of the invention, the feedback switch $26_0$ and the initialization switch $30_0$ are PMOS transistors, and the pull-up device $28_0$ is a controlled-current, i.e., long-channel, PMOS transistor. An advantage of the circuit $22_0$ is that after the initialization pulse is removed, the circuit $12_0$ draws no quiescent supply current regardless of whether the antifuse $18_0$ is programmed or unprogrammed.

In addition to the circuits $12_0$–$12_n$, the programmable bank 10 also includes programming/analog-testing circuitry 32, which is coupled across each of the antifuses $18_0$–$18_n$. The programming circuitry 32 includes a program/test circuit 34, which provides a programming voltage at the common node 20 to program selected ones of the antifuises $18_0$–$18_n$. A tester (not shown in FIG. 1) can be coupled to the common node 20 to provide a test voltage and measure the resultant test current to determine the impedances of the antifuses $18_0$–$18_n$, in an analog fashion. A program/decoder 36 couples to ground the first node of an antifuse 18 that is selected for either programming or analog testing.

The bank 10 further includes a bank-mode circuit 37, which includes the test circuit 16, a normal-mode switch 38, and a conventional mode-control circuit 44. The switch 38 couples the common node 20 to ground during normal operation of the bank 10. The test circuit 16 includes a switch 40 that couples the test node to ground through an impedance element 42 in a test mode during digital testing of the bank 10. The mode-control circuit 44 controls the switch 38 and the switch 40 of the test circuit 16. In one embodiment of the invention, the switches 38 and 40 are NMOS transistors, and the impedance element 42 is a resistor. In other embodiments of the invention, the impedance element 42 can be a long-channel PMOS transistor or any other conventional impedance device.

Still referring to FIG. 1, in operation during programming of the antifuse $18_0$, the gate of the isolation transistor $19_0$ is coupled to ground such that the transistor $19_0$ is inactive, and thus electrically isolates the antifuse $18_0$ from the latch/pull-up circuit $22_0$. The decoder 36 couples the first node of the antifuse $18_0$ to ground. The program/test circuit 34 then provides on the common node 20 a programming voltage that programs or "blows" the antifuse $18_0$, i.e., significantly lowers the impedance between its first and second nodes. In one aspect of the invention, the programming voltage is between 7 V and 9 V. Once programmed, the antifuse $18_0$ should be essentially a short circuit.

During optional and conventional analog testing of the programmed antifuse $18_0$, the program/test circuit 34 provides a test voltage on the common node 20, and a conventional tester (not shown in FIG. 1) measures the current through the antifuse $18_0$. If the measured impedance is less than a desired maximum impedance, the antifuse $18_0$ passes the test and is deemed to have been properly programmed. In one aspect of the invention, the desired maximum impedance is 300 ohms.

During normal operation, the program/test circuit 34 is inactive, and the decoder 36 uncouples the antifuse $18_0$ from ground. Furthermore, the ate of the isolation transistor $19_0$ is coupled to the voltage $V_1$, which in one embodiment of the invention, is approximately Vcc/2. Thus, if Vcc=5V, $V_1$=2.5V. In normal operation, the mode-control circuit 44 also turns off the transistor 40 to deactivate the test circuit 16, and turns on the switch 38, which couples the common node 20 to ground. An initialization pulse then activates the switch $30_0$ for a time sufficient to set the latch $27_0$, which generates $P_0$ equal to logic 1 if the antifuse $18_0$ is programmed, or generates $P_0$ equal to logic 0 if the antifuse $18_0$ is unprogrammed. Specifically, during normal operation when the initialization pulse is present and the antifuse $18_0$ is programmed to have a low impedance, a relatively large current flows through the switch $30_0$, the pull-up device $28_0$, the active isolation transistor $19_0$, and the antifuse $18_0$. The programmable circuit $12_0$ acts as a voltage divider and generates a reference voltage at the reference node $25_0$. Because the antifuse $18_0$ has a relatively low impedance, which is typically no more that a few hundred ohms, the reference voltage is low enough to represent a logic 0, and thus the inverter $24_0$ generates $P_0$ equal to logic 1. The logic 1 at the output $14_0$ of the inverter $24_0$ turns off the feedback switch $26_0$. After the initialization pulse is removed, the inactive feedback switch $26_0$ reinforces the logic 0 at the input of the latch $24_0$ so that the signal $P_0$ remains equal to logic 1.

During normal operation when the initialization pulse is present and the antifuse $18_0$ is unprogrammed to have a high impedance, little or no current flows through the switch $30_0$, the pull-up device $28_0$, the isolation transistor $19_0$, and the antifuse $18_0$. Thus, the device $28_0$ pulls up the reference voltage at the node $25_0$ to approximately Vcc, which is high enough to represent a logic 1, and the inverter $24_0$ generates $P_0$ equal to logic 0, which turns on the feedback switch $26_0$. After the initialization pulse is removed, the active feedback switch $26_0$ reinforces the logic 1 at the input of the latch $24_0$ so that the signal $P_0$ remains equal to logic 0. Furthermore, the isolation transistor $19_0$ maintains the voltage at the first node of the antifuse $18_0$ at one threshold voltage below $V_1$, which as stated above is approximately Vcc/2 in one aspect of the invention. Thus, the transistor $19_0$ insures that during normal operation, the voltage across the unprogrammed antifuse $18_0$ is too low to accidentally program it.

In operation during a digital test mode according to the first embodiment of the present invention, the programmed antifuses $18_0$–$18_n$ are tested to make sure that they are properly programmed, i.e., that their resistance is less than a desired maximum value. After the antifuse $18_0$ has been programmed, the programmed resistance of the antifuse $18_0$ is tested. During testing, the circuit $12_0$ operates in a manner similar to the normal operating mode described above, except that the mode-control circuit 44 shuts off the switch 38, and turns on the switch 40, thereby coupling the common node 20 to ground through the impedance element 42. The impedance element 42 effectively increases the impedance of the antifuse $18_0$, i.e., increases the impedance of the lower leg of the voltage divider, and thus increases the reference voltage at the node $25_0$. Therefore, if the circuit $12_0$ generates $P_0$ equal to logic 1 when the impedance element 42 is coupled between the antifuse $18_0$ and ground, then the manufacturer can be virtually certain that the circuit $12_0$ will generate $P_0$ equal to logic 1 during normal operation when the active switch 38 couples the antifuse $18_0$ directly to ground. Conversely, if during the digital test mode the circuit $12_0$ generates $P_0$ equal to logic 0, then the manufacturer knows that the antifuse $18_0$ is improperly programmed, or not programmed at all. At this point, one can instruct the programming circuitry 32 to reprogram the antifuse $18_0$. Or, if the circuit $12_0$ is expendable, it can be labeled as defective and not used.

For example, if the maximum desired impedance for the antifuse $18_0$ is 300 ohms, and 500 or more ohms between the node $25_0$ and ground will cause the reference voltage to be equivalent to logic 1 instead of logic 0, then the impedance element 42 has a value of approximately 200 ohms. Thus, during the digital test mode, if the impedance of the antifuse $18_0$ is greater than the maximum desired impedance of 300 ohms, the combined impedance between the node $25_0$ and ground is greater than or equal to 500 ohms, and $P_0$ equals logic 0. Conversely, if the impedance of the antifuse $18_0$ is less than the maximum desired impedance, the combined impedance is less than 500 ohms, and $P_0$ equals logic 1.

In one embodiment of the invention, all of the signals $P_0$–$P_n$ are coupled to a multiplexer (not shown in FIG. 1), which provides a selected one of the signals to an external pin of the device in which the bank 10 is incorporated so that a tester can sequentially read the signals $P_0$ –$P_n$ without internally probing the device.

Thus, the digital test mode according to the first embodiment of the invention allows a manufacturer to use a tester that need only read digital values instead of measuring an impedance in an analog fashion. A tester that reads only digital values is often less expensive to purchase and operate than one that must measure analog values. Furthermore, such a tester is often easier to operate. Additionally, even a tester that supports both digital and analog testing is often easier and cheaper to operate in the digital mode.

Moreover, the digital technique is often faster than prior analog techniques. Specifically, in the digital test mode, all the antifuses $18_0$–$18_n$ are connected so that the circuits $12_0$–$12_n$ are operational. Thus, one need only switch a multiplexer or move a probe from one signal P to the next, with no delay other than the multiplexer switching or probe movement time, which are often relatively short. Conversely, in the prior analog testing, each antifuse 18 must be individually switched into the test circuit. Because of the parasitic capacitances and inductances associated with the antifuses 18 and the bank 10 in general, after switching each antifuse 18 into the test circuit, one must wait a relatively long settling time before measuring the current therethrough. Thus, the greater the number of programmed antifuses 18 being tested, the more time the inventive digital technique will save over the prior analog technique.

Figure 2:
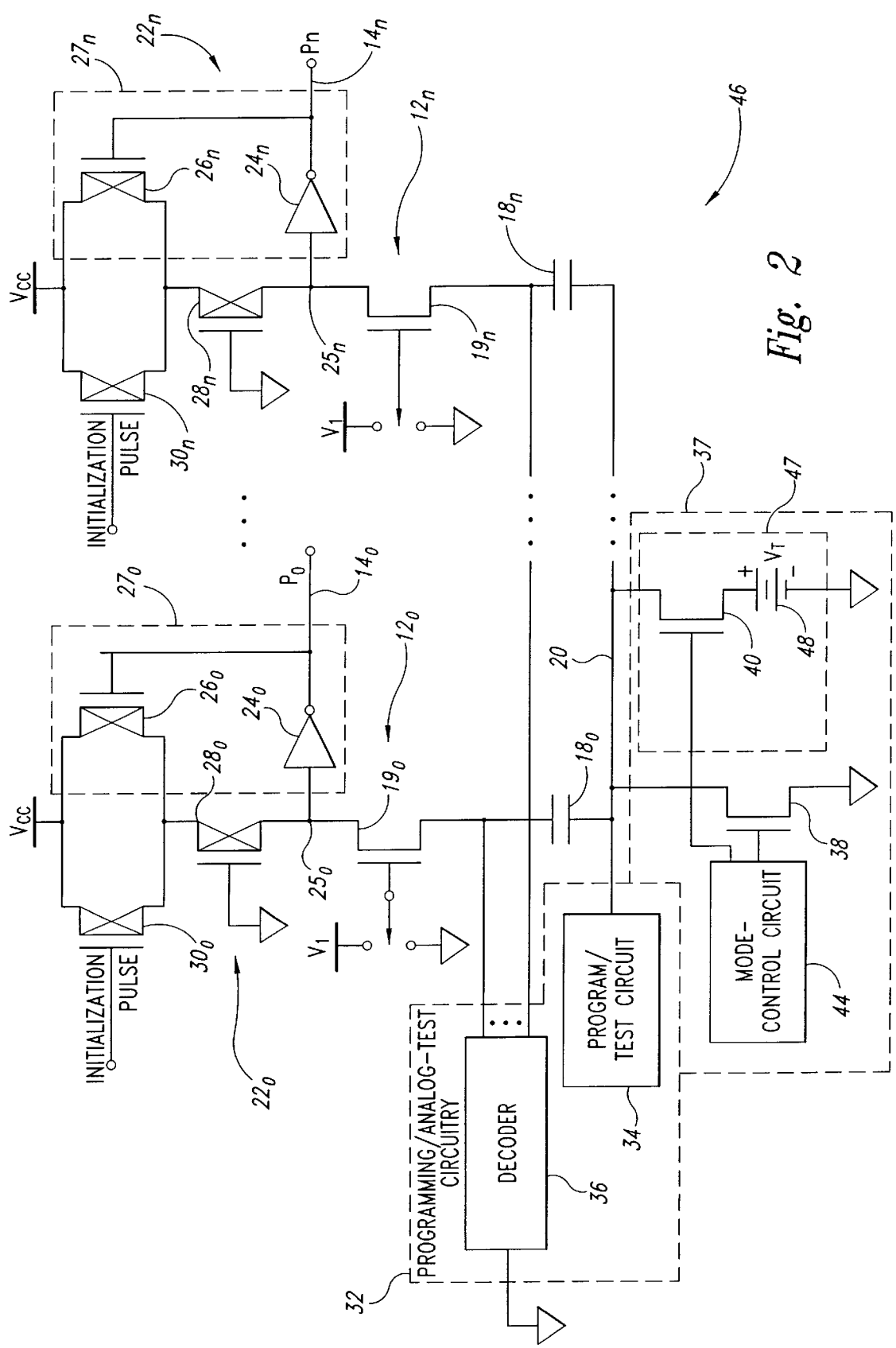
FIG. 2 is a schematic diagram of a programmable bank according to a second embodiment of the invention.

FIG. 2 is a schematic diagram of a programmable bank 46 according to a second embodiment of the invention. The bank 46 is similar in structure and operation to the bank 10 of FIG. 1, except that in place of the impedance device 42, a test circuit 47 includes a voltage source 48, such as a battery, that generates a positive test voltage VT on the common node 20 during the digital test mode. The test voltage VT has the same affect as discussed above for the impedance 42 of FIG. 1 in that it boosts the reference voltage at the node $25_0$, and thus effectively increases the impedance of the antifuse $18_0$ during digital testing. In one embodiment of the invention, VT is between 0.7 V and 1.5 V.

Figure 3:
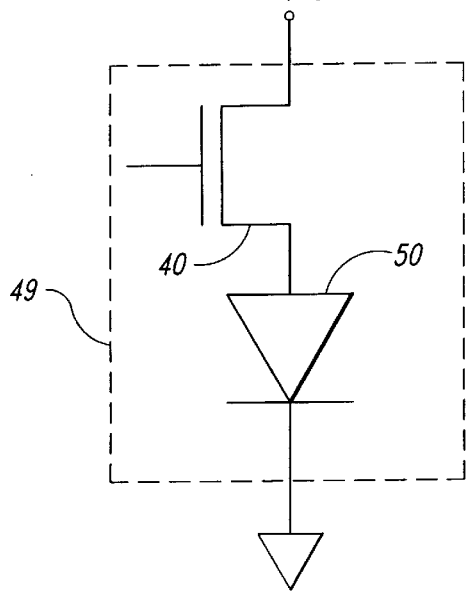
FIG. 3 is a schematic diagram of a first alternative embodiment of the test circuit of FIG. 2.

FIG. 3 is a schematic diagram of a test circuit 49 according to a first alternative embodiment of the invention. Specifically, the test circuit 49 can be used in place of the test circuit 47 of FIG. 2. In the test circuit 49, the voltage source 48 is a forward-biased PN junction diode 50, which generates a positive test voltage of approximately 0.7 V during the digital test mode when the switch 38 of FIG. 2 is inactive.

Figure 4:
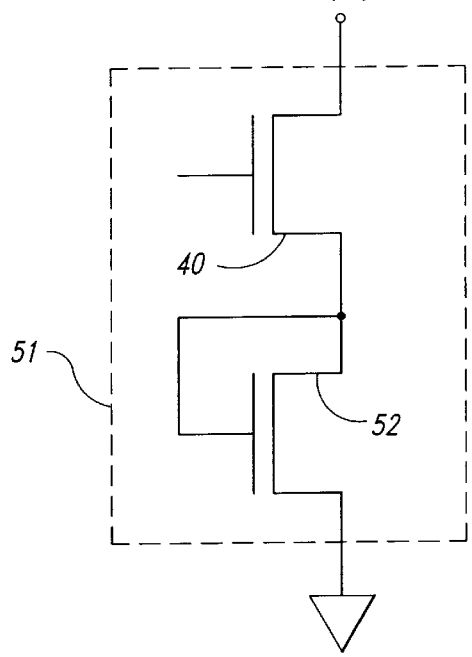
FIG. 4 is a schematic diagram of a second alternative embodiment of the test circuit of FIG. 2.

FIG. 4 is a schematic diagram of a test circuit 51 according to a second alternative embodiment of the invention. The test circuit 51 is similar to the test circuit 49 of FIG. 3, except that it includes a diode-connected NMOS transistor 52 instead of a PN junction diode. In a related embodiment of the invention, the test circuit 51 may include a diode-connected bipolar NPN transistor (not shown in FIG. 4) instead of the NMOS transistor 52.

Figure 5:
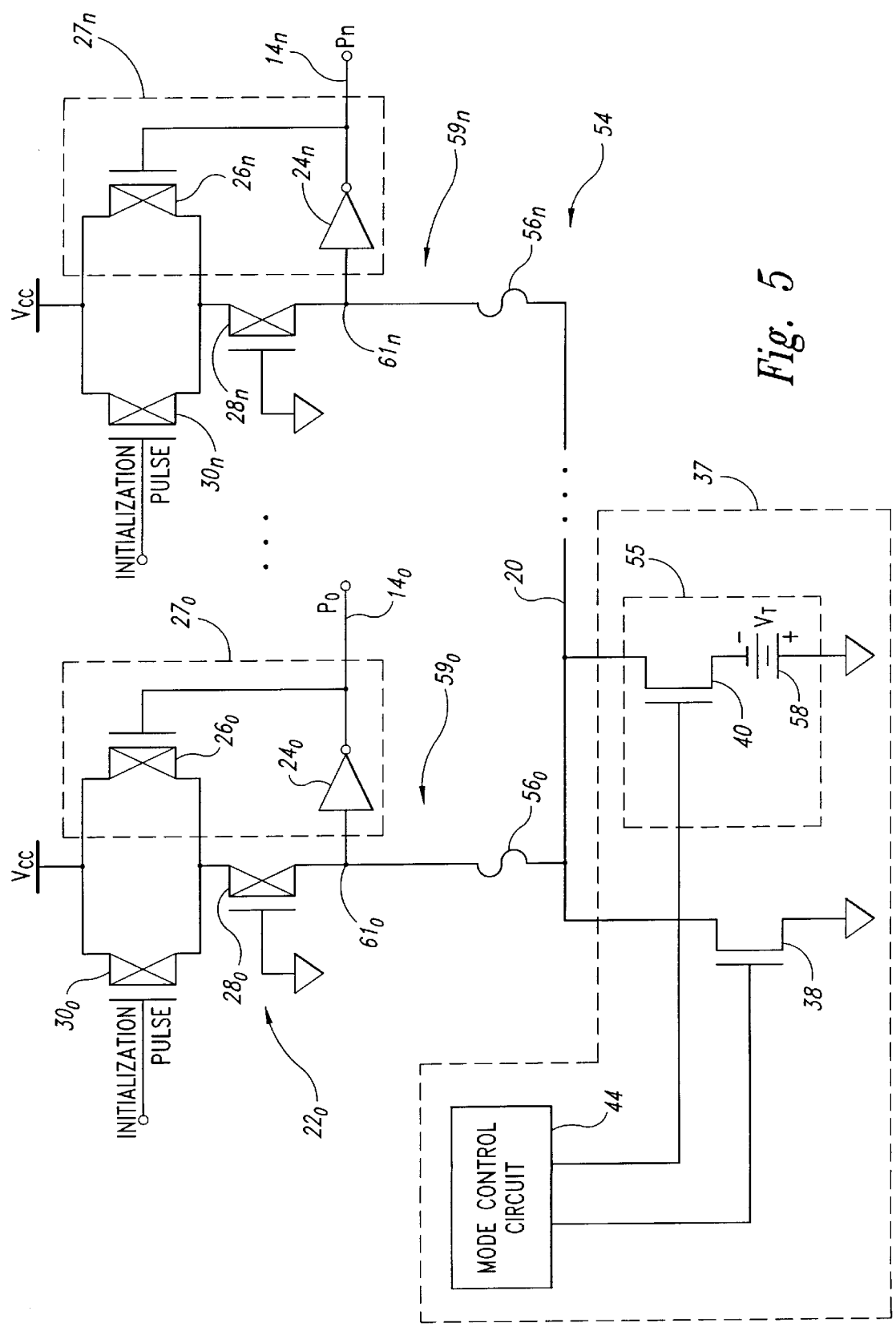
FIG. 5 is a schematic diagram of a programmable bank according to a third embodiment of the invention.

FIG. 5 is a schematic diagram of a programmable bank 54 according to a third embodiment of the invention. The bank 54 is similar to the bank 10 of FIG. 1 and the bank 46 of FIG. 2, except that programmable circuits $59_0$ include programmable elements $56_0$–$56_n$, and a test circuit 55 includes a voltage source 58, which generates a negative voltage −VT on the common node 20 during the digital test mode. In one aspect of the invention, the elements $56_{0-56n}$ are either laser-cutable fuses or electrically programmable fuses. Thus, unlike the antifuses $18_0$–$18_n$ of FIGS. 1 and 2, the fuses $56_0$–$56_a$ have a low impedance when unprogrammed, and have a high impedance when programmed. Because the fuses $56_0$–$56_n$ are not antifuses, the programming circuitry 32 and the isolation transistors 19 of the banks 10 and 46 may be omitted. In this case, the fuses $56_0$–$56_n$ are programmed using conventional means (not shown in FIG. 5)

that are external to the device that incorporates the bank 54. Alternatively, if the fuses $56_0$–$56_n$ are electrical fuses, then the bank 54 may include circuitry that is similar to the programming circuitry 32 of FIGS. 1 and 2. But for clarity, FIG. 5 includes no programming circuitry. Because the circuit $59_0$ is similar in structure and operation to the circuits $59_1$–$59_n$, the operation of the bank 54 is discussed below in greater detail with reference to the circuit $59_0$ for clarity.

During optional conventional analog testing of the element $56_0$, a technician uses an ohmmeter (both not shown in FIG. 5) to measure the impedance of the fuse $56_0$.

During normal operation, the bank 54 operates as described above in conjunction with the bank 10 of FIG. 1 and the bank 46 of FIG. 2, except that the circuit $59_0$ generates $P_0$ equal to logic 0 when the fuse $56_0$ is programmed, and generates $P_0$ equal to logic 1 when the fuse $56_0$ is unprogrammed. Again, this is because in contrast to the antifuses $18_0$–$18_n$ of FIGS. 1 and 2, the fuses $56_0$–$56_n$ have a high impedance when programmed, and a low impedance when unprogrammed.

During a digital test mode, the programmed fuses $56_0$–$56_n$ are tested to make sure that they are properly programmed, i.e., that their programmed resistance is greater than a desired minimum value. When the fuse $56_0$ is programmed, the circuit $59_0$ operates like it does during normal mode, except that the mode-control circuit 44 shuts off the switch 38, and turns on the transistor 40 to activate the test circuit 55 and couple the negative test voltage $-V_T$ to the common node 20. $-V_T$ effectively decreases the impedance of the fuse $56_0$ and thus decreases the reference voltage at the node $61_0$ as compared with normal operation. Therefore, if the circuit $59_0$ generates $P_0$ equal to logic 0 when $-VT$ is on the common node 20, then the manufacturer can be virtually certain that the circuit $59_0$ will generate $P_0$ equal to logic 0 during normal operation when the active switch 38 couples the common node 20 directly to ground. Conversely, if during the digital test mode the circuit $59_0$ generates $P_0$ equal to logic 1, then the manufacturer knows that the fuse $56_0$ is improperly programmed, or not programmed at all. At this point, the manufacturer can reprogram the fuse $56_0$, or, if the circuit $59_0$ is expendable, can label it as defective and not use it.

For example, using the conventional voltage-divider equation:

$$V_r = \frac{R_a}{R_a + R_b} \times V$$

where $V_r$ is the reference voltage at the node $61_0$, if Vcc equals 5 V, the threshold between logic 1 and logic 0 is approximately 2.5 V, the impedance of the element $28_0$ is 10 kilohm, and the desired minimum impedance of the fuse $56_0$ is 40 kilohm, then $-VT=-7.5$ V. Thus, during the digital test mode, if the impedance of the fuse $56_0$ is less than the desired minimum impedance, $P_0$ will equal logic 1. Conversely, if the impedance of the fuse $56_0$ is greater than the desired minimum impedance, $P_0$ will equal logic 0.

As discussed above in conjunction with FIG. 1, all of the signals $P_0$–$P_n$ may be coupled to a multiplexer (not shown in FIG. 5), which provides a selected one of the signals to an external pin of the device in which the bank 54 is incorporated so that a tester can sequentially read the signals $P_0$–$P_n$.

Figure 6:
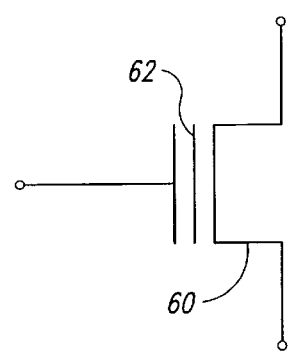
FIG. 6 is a schematic diagram of an alternative embodiment of the programmable elements of FIGS. 1, 2 and 5.

FIG. 6 is a schematic diagram of nonvolatile programmable element 60 according to an alternative embodiment of the invention. The programmable element 60 is a EEPROM cell that includes a floating gate 62. In a conventionally defined unprogrammed state, there is no voltage stored on the floating gate 62, and thus the EEPROM cell 60 has a low impedance, i.e., acts as a closed circuit, when a voltage is applied to its gate. In a conventionally defined programmed state, a negative voltage is stored on the floating gate 62, and thus the EEPROM cell 60 has a high impedance, i.e., acts as an open circuit, when a voltage is applied to its gate. Thus, the EEPROM cell 60 is similar to the fuse elements $56_0$–$56_n$ of FIG. 5, and in one aspect of the invention may be used in place of these fuse elements in the bank 54.

Figure 7:
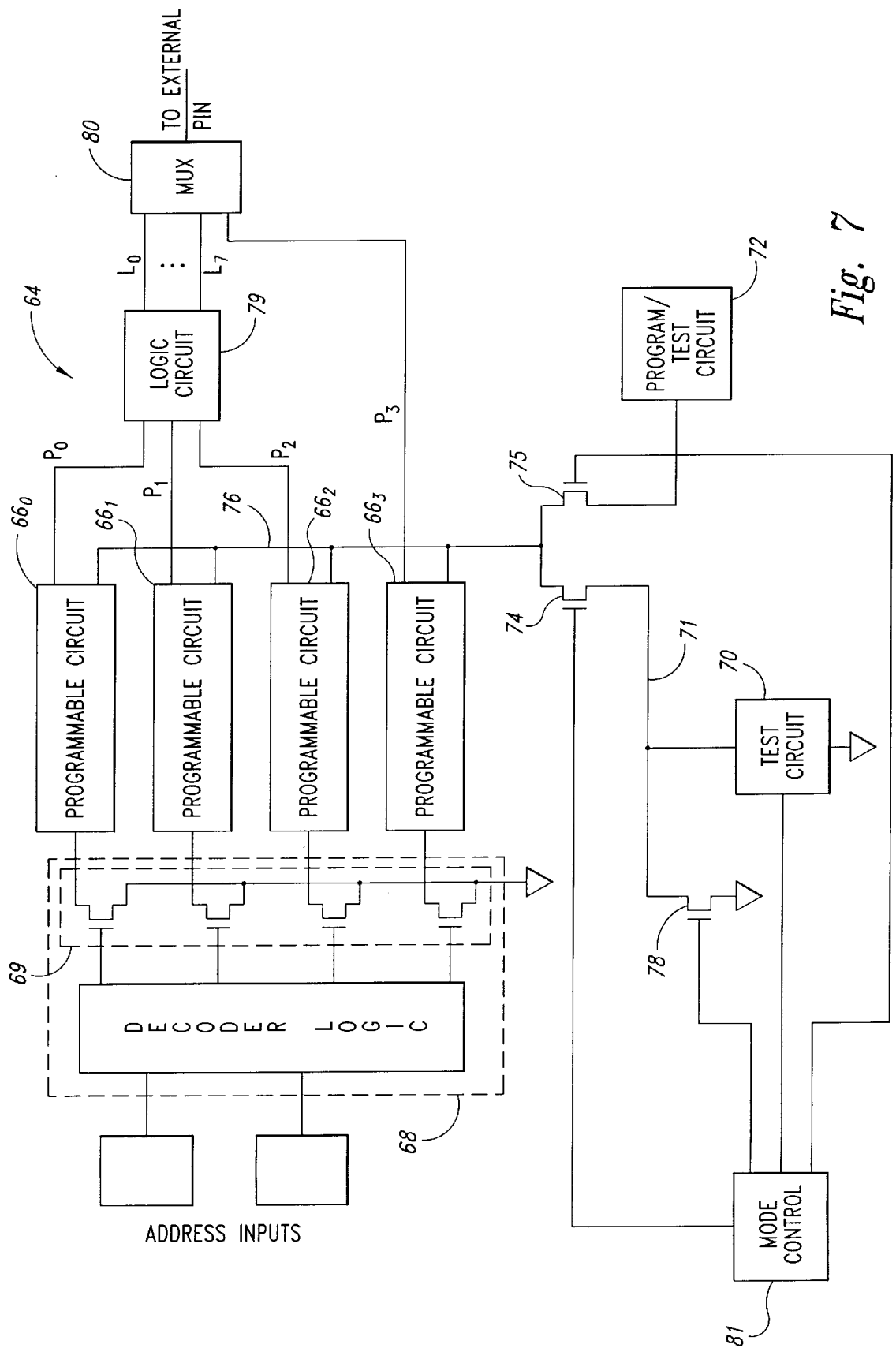
FIG. 7 is a schematic diagram of a programmable bank according to a fourth embodiment of the invention.

Still referring to FIG. 6, one can unconventionally define the unprogrammed state as when the floating gate 62 has a negative voltage stored thereon, and the programmed state as when there is no voltage stored on the floating gate 62. Using this unconventional definition, the EEPROM cell 60 resembles the antifuses $18_0$–$18_n$ of FIG. 1. Thus, in an aspect of the invention using these unconventional definitions of the programmed and unprogrammed states, EEPROM cells like the cell 60 may be used in place of the antifuse elements $18_0$–$18_n$ in the bank 10 of FIG. 1. If, however, one decides to use this unconventional technique, he has to first "unprogram" all of the cells 60 by storing negative voltages, on the floating gates 62 thereof. FIG. 7 is a schematic block diagram of a programmable bank 64 according to a fourth embodiment of the invention. The bank 64 allows simultaneous digital testing of more than one programmable circuit $66_0$–$66_3$ at a time. Although the four circuits $66_0$–$66_3$ are shown here for clarity, the bank 64 may include more or less of these circuits. Furthermore, in one aspect of the invention, the programmable circuits $66_0$–$66_3$ incorporate antifuses (not shown in FIG. 7), and are thus similar to the circuits $12_0$–$12_n$ of FIGS. 1 and 2.

The bank 64 includes a program/test decoder circuit 68, which selects the circuits $66_0$–$66_3$ that are to be programmed during a programming mode or are to be tested during a conventional test mode. A test circuit 70, which is coupled between a node 71 and ground, generates a test voltage or provides a test impedance during a digital test mode. The test circuit 70 may be similar to the test circuits 16 or 47 of FIGS. 1 and 2. A normal-mode switch 78 couples the node 71 to ground during normal operation of the bank 64. A program/test circuit 72 provides a programming voltage during programming of the circuits $66_0$–$66_3$, and provides a test voltage during the conventional test mode. In one aspect of the invention, the circuit 72 is a conductive pad to which an external test circuit (not shown in FIG. 7) provides the described programming and test voltages. A normal-mode/digital-test-mode switch 74 couples a node 76 that is common to the circuits $66_0$–$66_3$ to the node 71 during normal operation and during the digital test mode. A program-model/conventional-test-mode switch 75 couples the common node 76 to the program/test circuit 72 during programming or conventional testing of the bank 64. A logic circuit 79 receives the output signals $P_0$–$P_2$ of the circuits $66_0$–$66_2$, and logically combines them to generate resultant output signals $L_0$–$L_7$. A multiplexer 80 provides a selected one of the signals $L_0$–$L_7$ and $P_3$ to an external terminal of the device incorporating the bank 64 during the digital test mode. A mode-control circuit 81 controls the operation of the switches 74, 75, and 78, and the test circuit 70.

During the programming of the circuits $66_0$–$66_3$, the decoder 68 receives address signals at its address inputs and couples the selected one of the circuits $66_0$–$66_3$ to ground through a switching network 69. The switch 75 is active, and thus couples the common node 76 to the program/test circuit 72. Thus, in a manner similar to that described above in conjunction with FIG. 1, the circuit 72 generates a program voltage and thus programs those of the circuits $66_0$–$66_3$ that the decoder 68 selects for programming.

During the conventional test mode, the circuit 72 generates a test voltage, and external test circuitry measures the current flowing through the circuit 66 under test to determine the resistance of the programmable element therein and whether or not it has a desired value.

During normal operation, the decoder 68 deactivates the switching network 69, the switches 74 and 78 are active, and the switch 75 is inactive. The bank 64 thus operates similarly to the banks 10 and 46, except that the signals $P_0$–$P_2$ are not considered separately, but are considered as a predetermined logical combination. For example, the logic circuit 79 may generate a selected one of the signals $L_0$–$L_7$ equal to logic 1, and the remainder of these signals equal to logic 0, where each one of the eight possible combinations of the three signals $P_0$–$P_2$ selects a different one of the signals $L_0$–$L_7$ to equal logic 1. Thus, $P_0$–$P_2$ may be used together to select one of eight operational modes or circuit configurations.

During the digital test mode of operation according to the present invention, the tester can test the bank 64 more quickly by reading the appropriate one of the signals $L_0$–$L_7$ instead of reading all of the signals $P_0$–$P_2$ individually. Specifically, the decoder 68 disables all of the transistors in the switching network 69. The switch 74 is active, and the switches 75 and 78 are inactive so that the test circuit 70 can generate a test voltage or provide a test impedance at the common node 76. The digital testing then proceeds as discussed above in conjunction with FIG. 1. But instead of reading the signals $P_0$–$P_2$ individually, the tester reads the one of the signals $L_0$–$L_7$ that corresponds to the correct programmed combination of $P_0$–$P_2$. For example, if the circuits $66_0$–$66_2$ are programmed to generate the signals $P_0$–$P_2$ equal to logic 1, logic 0,and logic 1, respectively, and this sequence of values causes the logic circuit 79 to generate $L_5$ equal to logic 1, and $L_0$–$L_4$ and $L_6$–$L_7$ equal to logic 0,then the tester conventionally controls the multiplexer 80 to couple $L_5$ to the external read pin. If $L_5$ equals logic 1, then the tester, with just this one reading, determines that all of the circuits $66_0$–$66_2$ are properly programmed. By effectively testing more than one of the circuits $66_0$–$66_3$ simultaneously, the testing time can be significantly reduced as compared with reading the signals $P_0$–$P_3$ sequentially. In another aspect of the invention, the multiplexer 80 may be omitted, and the tester can directly probe the outputs of the logic gate L.

Figure 8:
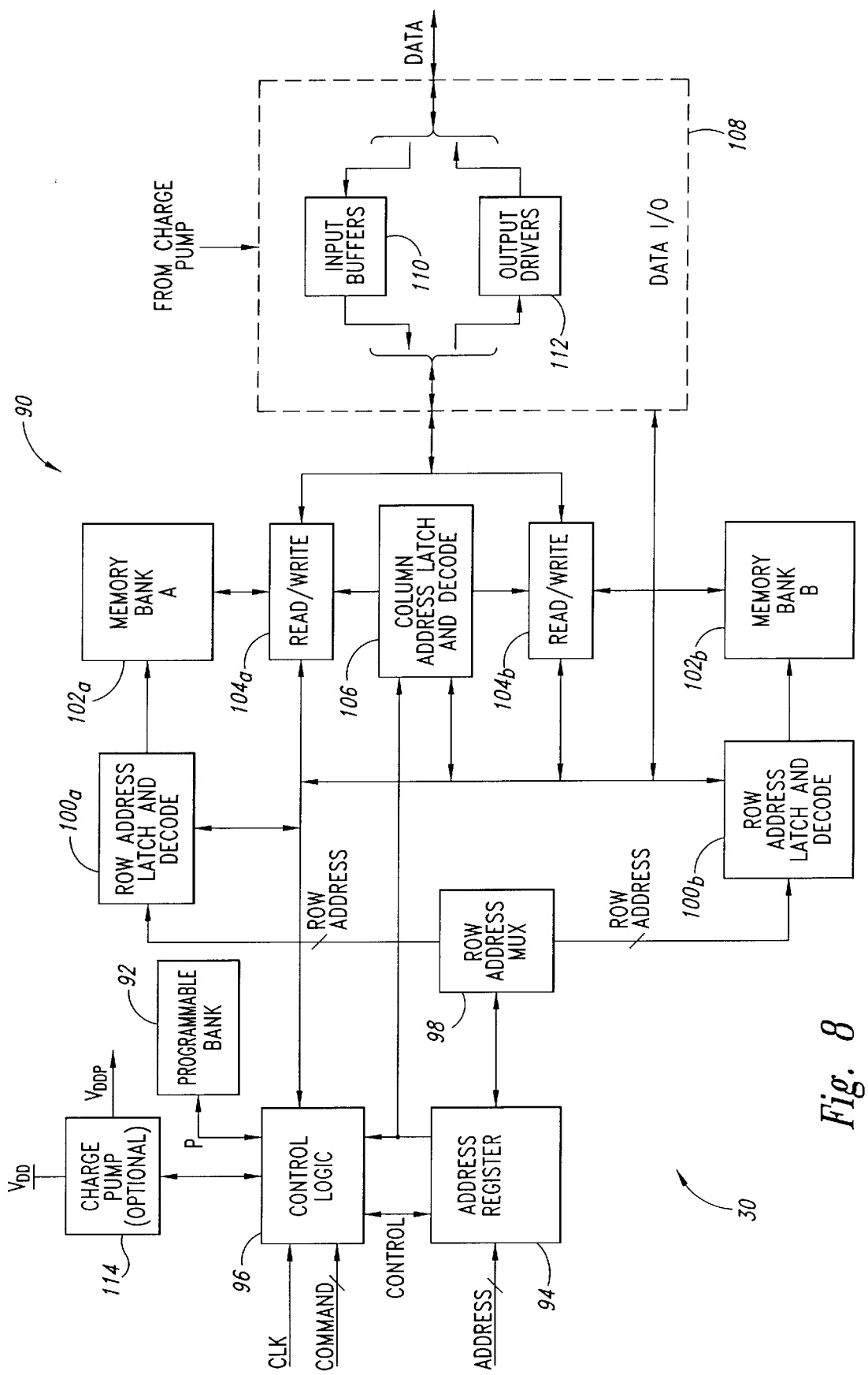
FIG. 8 is a schematic block diagram of a memory device that incorporates a programmable bank according to the present invention.

FIG. 8 is a schematic block diagram of a memory device 90, which incorporates a programmable bank 92 according to the present invention. The programmable bank 92 may be similar to one of the banks 10, 46, 54 or 64 of FIGS. 1, 2, 5 and 7, respectively. In one embodiment, the memory device 90 is a synchronous dynamic random access memory (SDRAM), although the inventive programmable bank 92 may be used in other types of memories, and in integrated circuits other than memories, such as microprocessors.

In addition to the programmable bank 92, the memory device 90 includes an address register 94, which receives an address from an address bus ADDRESS. A control logic circuit 96 receives CLK and COMMAND signals, receives the programmed signals P from the programmable bank 92, and communicates with and controls the other elements of the memory device 90.

A row-address multiplexer 98 receives the address signal from an address register 94, and provides the row address to row-address latch-and-decode circuits 100a and $10_b$. During read and write cycles, the row-address latch-and-decode circuits 100a and 100b activate the word lines of the addressed rows of memory cells in memory banks 102a and 102b, respectively. Read/write circuits 104a and 104b, respectively, read data from the addressed memory cells in the memory banks 102a and 102b during a read cycle, and respectively write data to the addressed memory cells during a write cycle. A column-address latch-and-decode circuit 106 receives the address from the address register 94 and provides the column address of the selected memory cells to the read/write circuits 104a and 104b. For clarity, the address register 94, the row-address multiplexer 98, the row-address latch-and-decode circuits 100a and 100b, and the column-address latch-and-decode circuit 106 can be collectively referred to as the address decoder.

A data input/output (I/O) circuit 108 includes a plurality of input buffers 110. During a write cycle, the buffers 110 receive and store data from the DATA bus, and the read/write circuits 104a and 104b, respectively, provide this stored data to the memory banks 102a and 102b. The data I/O circuit 108 also includes a plurality of output drivers 112. During a read cycle, the read/write circuits 104a and 104b respectively provide data from the memory banks 102a and 102b to the drivers 112, which in turn provide this data to the DATA bus.

The memory device 90 may also include an optional charge pump 114, which steps up the power-supply voltage $V_{DD}$ to a voltage $V_{DDP}$. In one aspect of the invention, the pump 114 generates $V_{DDP}$ approximately 1 V to 1.5 V higher than $V_{DD}$. The memory device 90 may use $V_{DDP}$ to overdrive selected internal transistors in a conventional manner.

In operation, if the memory device 90 is a SDRAM, then all of the input signals and output signals, as well as many of the internal signals, are synchronized to the CLK signal. The control logic 96, in response to the programmed values P from the programmable bank 92, controls the operational modes of the memory device 90 in accordance with these values. Additionally, the control logic 96 may also configure various circuits on the memory device 90 in response to the programmed values P. For example, redundant memory elements may be programmed to be responsive to addresses of defective elements such as rows or columns of memory bits.

Alternatively, the programmable bank 92 may be coupled directly to these configurable circuits, and thus supply the signals P directly thereto.

Figure 9:
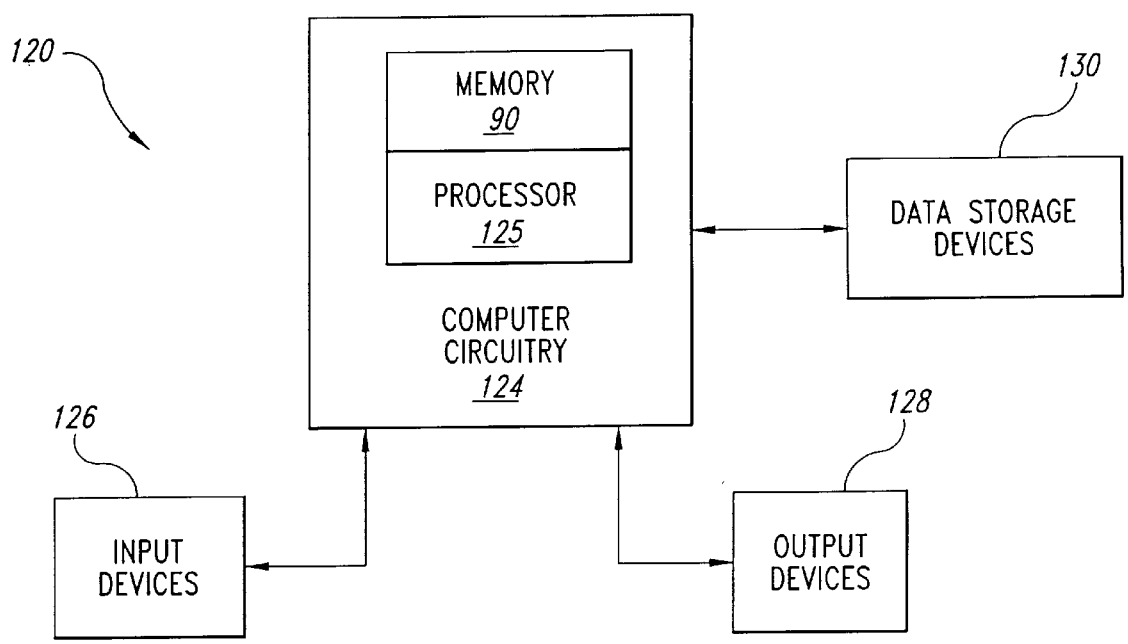
FIG. 9 is a schematic block diagram of a computer system that incorporates the memory device of FIG. 8.

FIG. 9 is a schematic block diagram of a computer system 120, which incorporates the memory 90 of FIG. 8. The computer system 120 includes computer circuitry 124 for performing computer functions, such as executing software to perform desired calculations and tasks. The computer circuitry 124 typically includes a processor 125 and the memory device 90, which is coupled to the processor 125. One or more input devices 126, such as a keypad or a mouse, are coupled to the computer circuitry 124 and allow an operator (not shown) to manually input data thereto. One or more output devices 128 are coupled to the computer circuitry 124 to provide the operator with the data generated by the computer circuitry 124. Examples of such output devices 128 include a printer and a video display unit. One or more data-storage devices 130 are coupled to the computer circuitry 124 to store data on or retrieve data from external storage media (not shown). Examples of the storage devices 133 and the corresponding storage media include drives that accept hard and floppy disks, tape cassettes, and compact disk read-only memories (CD-ROMs). Typically, the computer circuitry 124 includes address, data, and command busses and a clock line that are respectively coupled to the ADDRESS, DATA, and COMMAND busses and the CLK line of the memory device 90.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A memory device, comprising:
    first and second supply nodes;
    address, data, and command busses;
    a bank of memory cells;
    an address decoder coupled to said address bus and said memory bank;
    a control circuit coupled to said command bus and to said address decoder;
    a read/write circuit coupled to said address decoder, control circuit, and memory bank;
    a data input/output circuit coupled to said data bus, read/write circuit, and control circuit; and
    a programmable voltage divider having normal and test modes of operation, the divider comprising,
        a divider node operable to provide a reference value,
        a first divider element coupled between said first supply node and said divider node,
        a controlled node,
        a second divider element coupled between said divider node and said controlled node, said second divider element having a selectable resistivity, and
        a test circuit coupled between said controlled node and said second supply node, said test circuit operable to generate a voltage at said controlled node during said normal mode of operation and to vary said voltage during said test mode of operation.

2. The memory device of claim 1 wherein:
    said test circuit increases said voltage at said controlled node during said test mode; and
    said first and second divider elements are operable during said test mode to generate said data value having a first logic level when said second divider element has a resistivity that is less than or equal to a desired maximum value and to generate said data value having a second logic level when said second divider element has a resistivity that is greater than said desired maximum value.

3. The programmable voltage divider of claim 1 wherein:
    said test circuit decreases said voltage at said controlled node during said test mode; and
    said first and second divider elements are operable during said test mode to generate said data value having a first logic level when said second divider element has a resistivity that is greater than or equal to a desired minimum value and to generate said data value having a second logic level when said second divider element has a resistivity that is less than said desired minimum value.

4. The memory device of claim 1 wherein said test circuit comprises:
    a first switch coupled between said controlled node and said second supply node;
    a series combination of a second switch and a fixed voltage source , said series combination coupled in parallel with said first switch; and
    said test circuit operable during said test mode to open said first switch and to close said second switch.

5. The memory device of claim 1 wherein said test circuit comprises:
    a first switch coupled between said controlled node and said second supply node;
    a series combination of a second switch and an impedance element, said series combination coupled in parallel with said first switch; and
    said test circuit operable during said test mode to open said first switch and to close said second switch.

6. The memory device of claim 1 wherein said second divider element comprises an antifuse.

7. The memory device of claim 1 wherein said second divider element comprises a laser-cuttable fuse.

8. The memory device of claim 1 wherein said second divider element comprises an electrically blowable fuse.

9. The memory device of claim 1 wherein said second divider element comprises an electrically erasable and programmable cell.

10. A computer system, comprising:
    a data input device;
    a data output device; and
    computing circuitry coupled to said data input and output devices, said computing circuitry including a memory device that includes,
        first and second supply nodes,
        address, data, and command busses,
        a bank of memory cells,
        an address decoder coupled to said address bus and said memory bank,
        a control circuit coupled to said command bus and to said address decoder,
        a read/write circuit coupled to said address decoder, control circuit, and memory bank,
        a data input/output circuit coupled to said data bus, read/write circuit, and control circuit, and
        a programmable voltage divider having normal and test modes of operation, the divider comprising,
            a divider node operable to provide a programmed value,
            a first divider element coupled between said first supply node and said divider node,
            a test node,
            a second divider element coupled between said divider node and said test node, said second divider element having a selectable resistivity, and
            a test circuit coupled between said test node and said second supply node, said test circuit operable to generate a voltage at said test node during said normal mode of operation and to vary said voltage during said test mode of operation.

11. The computer system of claim 10 wherein:
    said test circuit increases said voltage at said test node during said test mode; and
    said first and second divider elements are operable during said test mode to generate said programmed value having a first logic level when said second divider element has a resistivity that is less than or equal to a desired maximum value and to generate said programmed value having a second logic level when said second divider element has a resistivity that is greater than said desired maximum value.

12. The computer system of claim 10 wherein:
    said test circuit decreases said voltage at said test node during said test mode; and
    said first and second divider elements are operable during said test mode to generate said programmed value having a first logic level when said second divider element has a resistivity that is greater than or equal to a desired minimum value and to generate said programmed value having a second logic level when said second divider element has a resistivity that is less than said desired minimum value.

13. The computer system of claim 10 wherein said test circuit comprises:

a first switch coupled between said test node and said second supply node;

a series combination of a second switch and a fixed voltage source, said series combination coupled in parallel with said first switch; and said test circuit operable during said test mode to open said first switch and to close said second switch.

14. The computer system of claim 10 wherein said test circuit comprises:

a first switch coupled between said test node and said second supply node;

a series combination of a second switch and an impedance element, said series combination coupled in parallel with said first switch; and said test circuit operable during said test mode to open said first switch and to close said second switch.

* * * * *